United States Patent
Stevenson et al.

(10) Patent No.: US 7,525,542 B2
(45) Date of Patent: Apr. 28, 2009

(54) AUTOMATICALLY GENERATING APPROPRIATE NEAR AND FAR CLIPPING PLANES FOR A 3D SCENE WHILE GUARANTEEING MINIMUM OF Z-BUFFER PRECISION

(75) Inventors: Alexander Stevenson, Bellevue, WA (US); Daniel N. Wood, Seattle, WA (US); Daniel R. Lehenbauer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/376,050

(22) Filed: Mar. 15, 2006

(65) Prior Publication Data

US 2007/0216710 A1   Sep. 20, 2007

(51) Int. Cl.
*G06T 15/40* (2006.01)
*G06T 15/30* (2006.01)

(52) U.S. Cl. ........................ 345/422; 345/421
(58) Field of Classification Search ................. 345/421, 345/422
See application file for complete search history.

(56) References Cited

U.S. PATENT DOCUMENTS

| | | | | |
|---|---|---|---|---|
| 3,816,726 | A * | 6/1974 | Sutherland et al. | 345/623 |
| 5,088,054 | A * | 2/1992 | Paris, II | 345/421 |
| 5,574,835 | A * | 11/1996 | Duluk et al. | 345/421 |
| 5,579,455 | A * | 11/1996 | Greene et al. | 345/422 |
| 5,952,993 | A * | 9/1999 | Matsuda et al. | 345/474 |
| 6,046,746 | A * | 4/2000 | Deering | 345/422 |
| 6,052,129 | A * | 4/2000 | Fowler et al. | 345/620 |
| 6,115,047 | A * | 9/2000 | Deering | 345/422 |
| 6,222,555 | B1 * | 4/2001 | Christofferson et al. | 345/428 |
| 6,285,779 | B1 * | 9/2001 | Lapidous et al. | 382/106 |
| 6,453,065 | B1 * | 9/2002 | Lapidous et al. | 382/154 |
| 6,628,284 | B1 * | 9/2003 | Fossum et al. | 345/427 |
| 6,664,975 | B1 * | 12/2003 | Hatch | 345/622 |
| 7,170,530 | B2 * | 1/2007 | Cui et al. | 345/620 |
| 2003/0043147 | A1 * | 3/2003 | Heim et al. | 345/421 |
| 2004/0169651 | A1 * | 9/2004 | Everitt et al. | 345/426 |
| 2005/0156927 | A1 * | 7/2005 | Lee et al. | 345/422 |

OTHER PUBLICATIONS

McCool, M. D., "Shadow volume reconstruction from depth maps", ACM Transactions on Graphics (TOG), vol. 19, No. 1, (Jan. 2000), pp. 1-26.*

Shreiner, et al., "An interactive introduction to OpenGL programming", ACM SIGGRAPH 2004 Course Notes, Aug. 8-12, 2004, SIGGRAPH '04. ACM, New York, NY, 111 pages.*

(Continued)

*Primary Examiner*—Ulka Chauhan
*Assistant Examiner*—Roberta Prendergast

(57) ABSTRACT

Various technologies and techniques are disclosed that improve the automatic generation of near and far clipping planes for a 3D scene. The viewing frustum is intersected with the scene to determine the range of depth that a particular scene occupies in the viewing frustum. The ratio of the near clipping plane to far clipping plane is adjusted as appropriate to ensure a desired minimum level of Z-buffer precision is achieved. The clipping planes are set sufficiently far outside of the object bounds to prevent triangles which are parallel to the clip planes from being accidentally clipped. An API is provided to allow other programs to retrieve the near and far clipping plane values with the desired minimum Z-buffer precision for a particular scene without having to interact with the Z-buffer.

16 Claims, 7 Drawing Sheets

OTHER PUBLICATIONS

Blinn, J.F.; "A trip down the graphics pipeline: the homogeneous perspective transform", IEEE Computer Graphics and Applications, vol. 13, Issue 3, May 1993, pp. 75-80.*

Deussen, et al., "Computer-generated pen-and-ink illustration of trees", Proceedings of the 27th Annual Conference on Computer Graphics and interactive Techniques, ACM Press/Addison-Wesley Publishing Co., NY, NY, pp. 13-18.*

Li, G., et al., "Chameleon: An Interactive Texture-based Rendering Framework for Visualizing Three-dimensional Vector Fields", Proceedings of the 14th IEEE Visualization 2003 (Vis'03,) Oct. 22-24, 2003, IEEE Visualization, IEEE Computer Society, Washington, DC, 32 pages.*

McGuire, M. et al., "Hardware-determined feature edges", Proceedings of the 3rd international Symposium on Non-Photorealistic Animation and Rendering, Jun. 7-9, 2004, S. N. Spencer, Ed., NPAR '04, ACM, NY, NY, pp. 35-147.*

"Setting Z-Buffer Bounds Automatically", Steve Hollasch pp. 1-3, Dec. 18, 1996, http://steve.hollasch.net/cgindex/render/zbound.html.

* cited by examiner

AUTOMATICALLY GENERATING APPROPRIATE NEAR AND FAR CLIPPING PLANES FOR A 3D SCENE WHILE GUARANTEEING MINIMUM OF Z-BUFFER PRECISION

BACKGROUND

In order for a computer to render an image of three-dimensional graphics properly, it needs to determine what objects are in front of others in a scene. A Z-buffer (or "Depth Buffer") stores a depth value for each pixel of a rendered image, which allows the computer to determine whether each object rendered appears in front of any other object in the scene, on a per-pixel basis.

Because the Z-Buffer only offers a finite amount of precision to store the depth value for each pixel, problems can occur when multiple objects resolve to the same depth value. In addition, the amount of precision varies throughout the 3D scene, as will be described later, so it can be different for the front of the scene and the back of the scene. In particular, the available precision is affected by the choice of the near and far clipping planes for the 3D scene.

Standard systems for generating near and far clipping planes for a 3D scene only consider the bounds of the 3D scene, and ignore the fact that they sacrifice Z-buffer precision as the ratio of near clipping plane distance to far clipping plane distance approaches zero. In addition, systems which only consider the bounds of the scene can suffer from the problem where objects from the very front or very back of the scene can disappear due to precision problems, even though they lie within the near and far clipping plane.

SUMMARY

Various technologies and techniques are disclosed that improve the automatic generation of near and far clipping planes for a 3D scene. The viewing frustum is intersected with the scene to determine the range of depth that a particular scene occupies in the viewing frustum. The ratio of the near clipping plane to far clipping plane is adjusted as appropriate to ensure a desired minimum level of Z-buffer precision is achieved. Alternatively or additionally, depending on the type of projection used for the scene, the clipping of objects which are located at the near or far clipping plane is prevented.

For orthographic projections, since the precision of the Z-buffer is uniform and related to the magnitude of the difference between the far clipping plane and the near clipping plane, there is no need to change either near or far plane to account for z-buffer precision, but both planes need to be adjusted to prevent clipping of objects located right at the clipping planes. For perspective projections, the desired minimum Z-buffer precision is ensured by adjusting the near plane to maintain a desired ratio between near and far clipping planes, and then each plane is displaced by an appropriate amount to prevent clipping at the plane.

Alternatively or additionally, an API is provided to allow other programs to retrieve the near and far clipping plane values with the desired minimum Z-buffer precision for a particular scene without having to interact with the Z-buffer.

This Summary was provided to introduce a selection of concepts in a simplified form that are further described below in the Detailed Description.

This Summary is not intended to identify key features or essential features of the claimed subject matter, nor is it intended to be used as an aid in determining the scope of the claimed subject matter.

DETAILED DESCRIPTION

Figure 1:
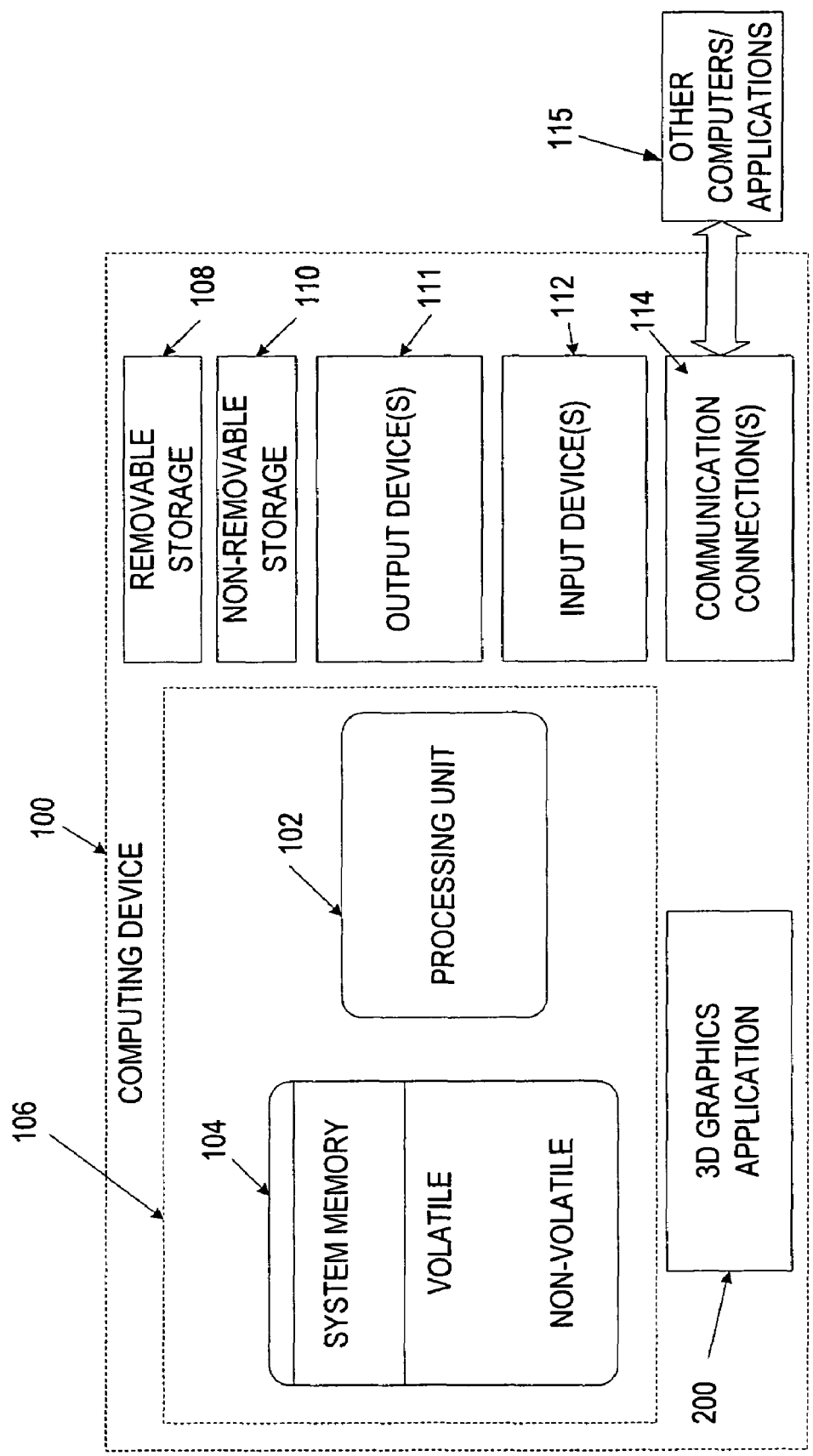
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that automatically generates near and far clipping planes for a 3D scene, but the system also serves other purposes in addition to these. In one implementation, one or more of the techniques described herein can be implemented as features within a 3D graphics program, or from any other type of program or service that automatically generates near and far clipping planes for a 3D scene or interacts with another program that automatically generates near and far clipping planes for a 3D scene.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers and/or applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes 3D graphics application 200, as discussed in further detail in FIG. 2.

Figure 2:
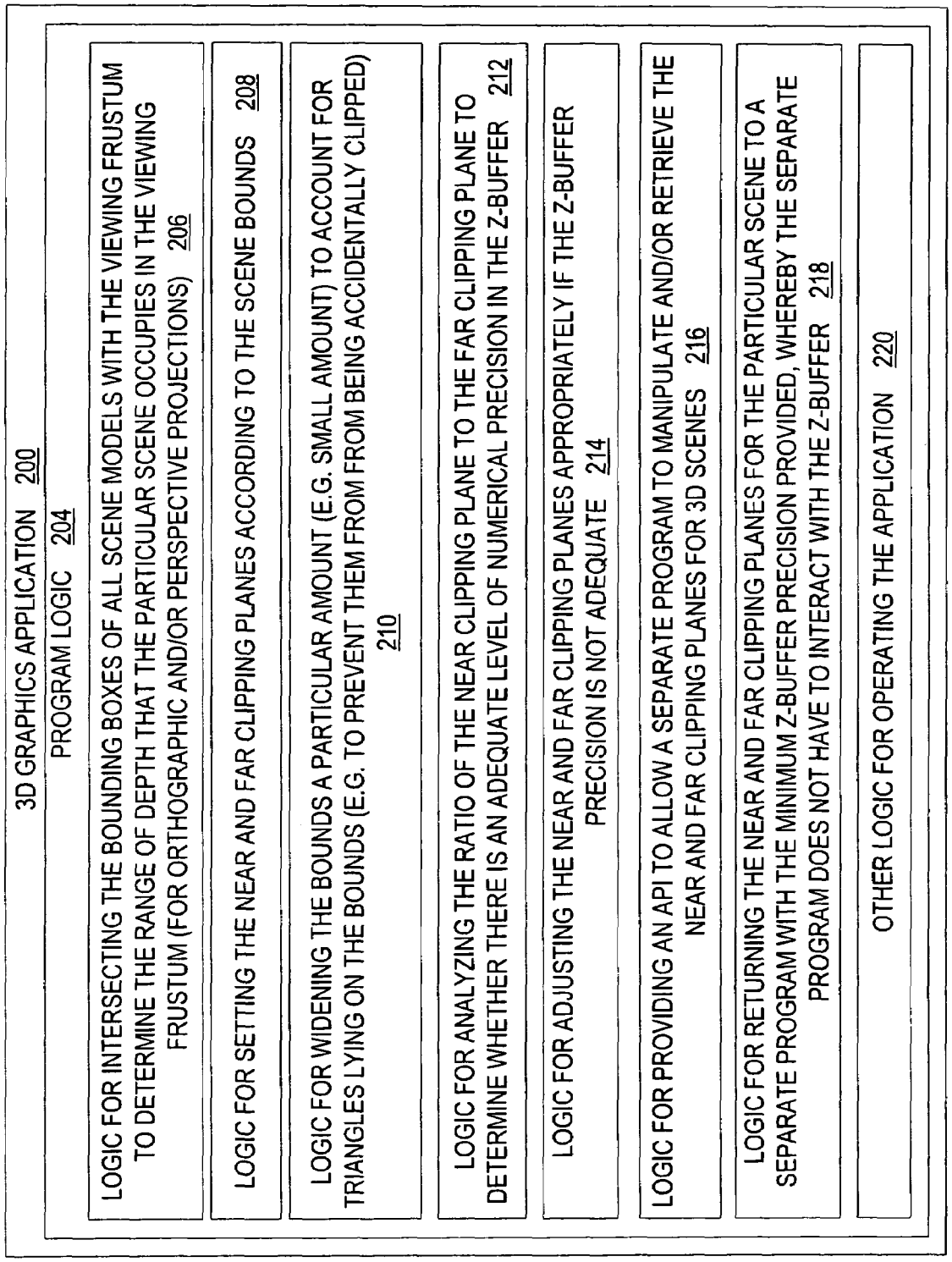
FIG. 2 is a diagrammatic view of a 3D graphics application of one implementation operating on the computer system of FIG. 1.

Turning now to FIG. 2 with continued reference to FIG. 1, a 3D graphics application 200 operating on computing device 100 is illustrated. 3D graphics application 200 is one of the application programs that reside on computing device 100. However, it will be understood that 3D graphics application 200 can alternatively or additionally be embodied as computer-executable instructions on one or more computers and/or in different variations than shown on FIG. 2. Alternatively or additionally, one or more parts of 3D graphics application 200 can be part of system memory 104, on other computers and/or applications 115, or other such variations as would occur to one in the computer software art.

3D graphics application 200 includes program logic 204, which is responsible for carrying out some or all of the techniques described herein. Program logic 204 includes logic for intersecting the bounding boxes of all scene models with the viewing frustum to determine the range of depth that the particular scene occupies in the viewing frustum (for orthographic and/or perspective projections) 206; logic for setting the near and far clipping planes according to the scene bounds 208; logic for widening the bounds a particular amount (e.g. a small amount) to account for triangles lying on the bounds (e.g. to prevent them from being accidentally clipped) 210; logic for analyzing the ratio of the near clipping plane to the far clipping plane to determine whether there is an adequate level of numerical precision in the Z-buffer 212; logic for adjusting the near and far clipping planes appropriately if the Z-buffer precision is not adequate 214; logic for providing an API to allow a separate program to manipulate and/or retrieve the near and far clipping planes for 3D scenes 216; logic for returning the near and far clipping planes for the particular scene to a separate program with the minimum Z-buffer precision provided, whereby the separate program does not have to interact with the Z-buffer 218; and other logic for operating application 220. In one implementation, program logic 204 is operable to be called programmatically from another program, such as using a single call to a procedure in program logic 204.

Figure 3:
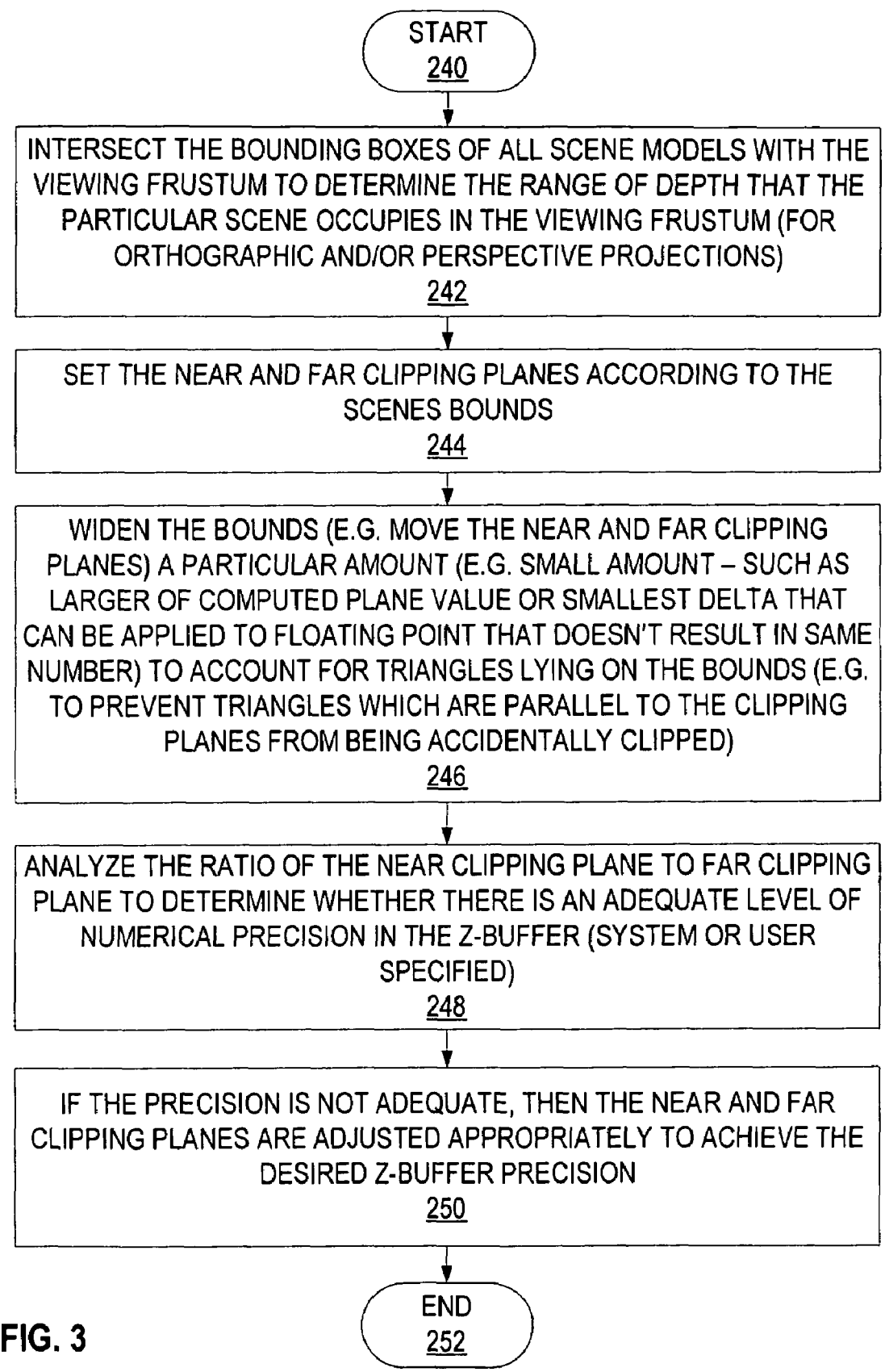
FIG. 3 is a high-level process flow diagram for one implementation of the system of FIG. 1.

Turning now to FIGS. 3-7 with continued reference to FIGS. 1-2, the stages for implementing one or more implementations of 3D graphics application 200 are described in further detail. FIG. 3 is a high level process flow diagram for 3D graphics application 200. In one form, the process of FIG. 3 is at least partially implemented in the operating logic of computing device 100. The procedure begins at start point 240 with intersecting the bounding boxes of all scene models with the viewing frustum to determine the range of depth that the particular scene occupies in the viewing frustum (stage 242). The near and far clipping planes are set according to the scenes bounds (stage 244). The bounds are widened a small amount to account for triangles lying on the bounds, such as to prevent triangles which are parallel to the clipping planes from being accidentally clipped (stage 246). In other words, the near and far clipping planes are moved a small amount to account for triangles lying on the bounds. In one implementation, the small amount is the larger of the computed plane value or the smallest delta that can be applied to the floating point value that does not result in the same number to ensure the geometry will not be clipped. The ratio of the near clipping plane to the far clipping plane is analyzed to determine whether there is an adequate level of numerical precision (stage 248). In one implementation, the desired ratio can be system specified and/or user specified. If the Z-buffer precision is not adequate, then the near and far clipping planes are adjusted appropriately to achieve the desired Z-buffer precision (stage 250). The process ends at end point 252.

Figure 4:
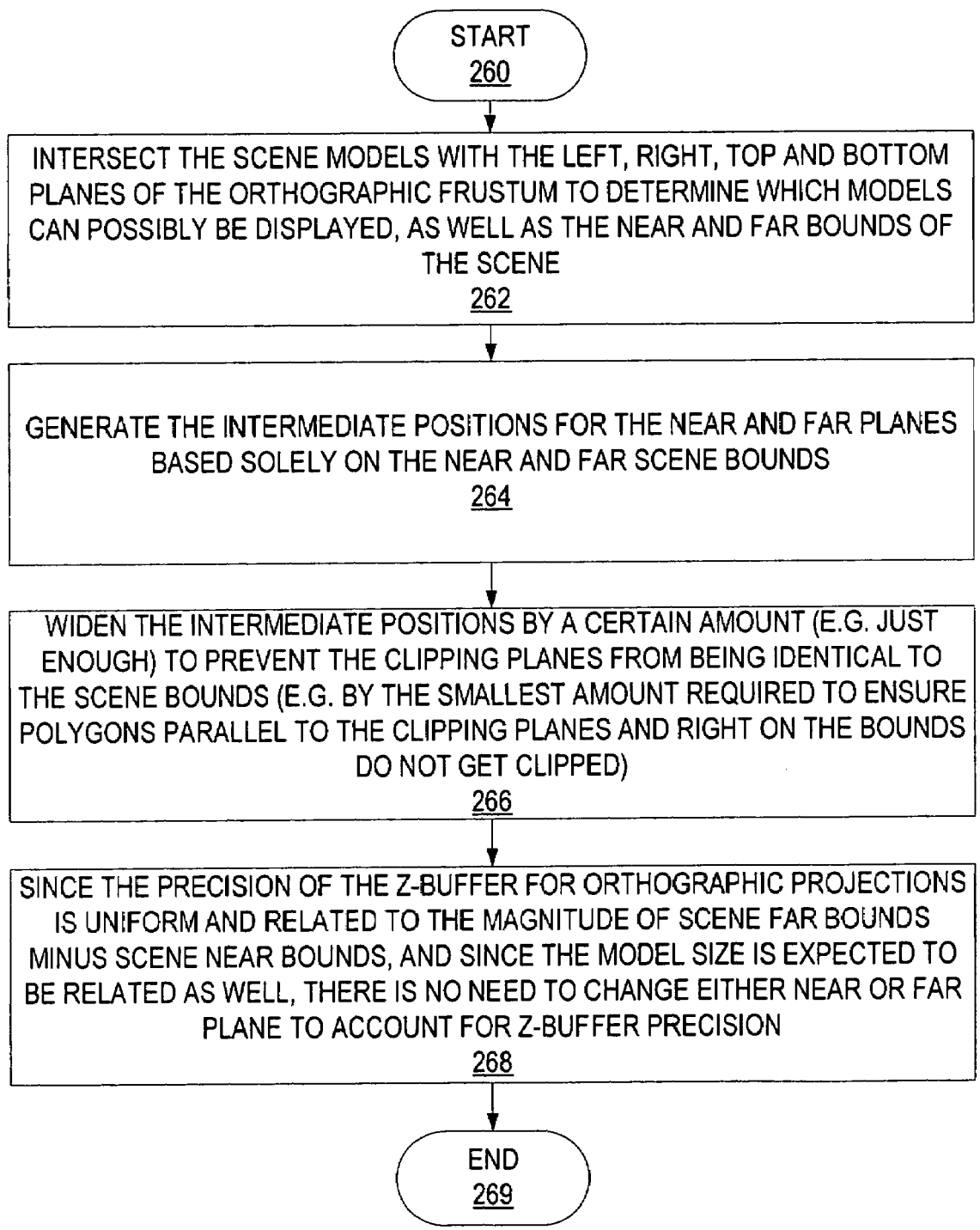
FIG. 4 is a process flow diagram for one implementation of the system of FIG. 1 illustrating the stages involved in automatically generating near and far clipping planes for orthographic projections while ensuring a desired minimum Z-buffer precision.

FIG. 4 illustrates one implementation of a more detailed process for automatically generating near and far clipping planes for orthographic projections while ensuring a desired minimum Z-buffer precision. In one form, the process of FIG. 4 is at least partially implemented in the operating logic of computing device 100. The procedure begins at start point 260 with intersecting the scene models with the left, right, top and bottom planes of the orthographic frustum to determine which models can possibly be displayed, as well as the near and far bounds of the scene (stage 262). In one implementation, the intermediate positions are generated for the near and far planes based solely on the near and far scene bounds ($S_{near}$ and $S_{far}$) (stage 264). The intermediate positions are then widened a certain amount (e.g. just enough) to prevent the clipping planes from being identical to the scene bounds (stage 266). As one non-limiting example, this widening is done by the smallest amount required to ensure polygons parallel to the clipping planes and right on the bounds do not get clipped (stage 266).

In one implementation, which works for orthographic projections, the Z-buffer is 24 bit fixed precision. As one non-limiting example, by using a desired minimum Z-buffer value of 1.5, even the nearest objects resolve to a different value in the fixed-precision Z-buffer than the near clipping plane. Using these parameters as non-limiting examples, the stages for generating the intermediate positions for the near and far planes based on the near and far scene bounds (stage 264) while widening them slightly (stage 266) are performed by solving the following equation:

$$e = \frac{1.5}{2^{24} - 1}$$

and plugging the results into the following equation to compute the near plane:

$$n = \frac{S_{near}(1 - e) - S_{far}e}{1 - 2e}$$

The far plane can be computed by:

$$f = \frac{S_{near}e + S_{far}(e-1)}{2e-1} \text{ or simply } f = (S_{near} - n) + S_{far}.$$

In one implementation, since the precision of the Z-buffer for orthographic projections is uniform and related to the magnitude of scene far bounds minus scene near bounds, and since the model size is expected to be related as well, there is no need to change either near or far plane to account for precision (stage 268). The process ends at end point 269.

Figure 5:
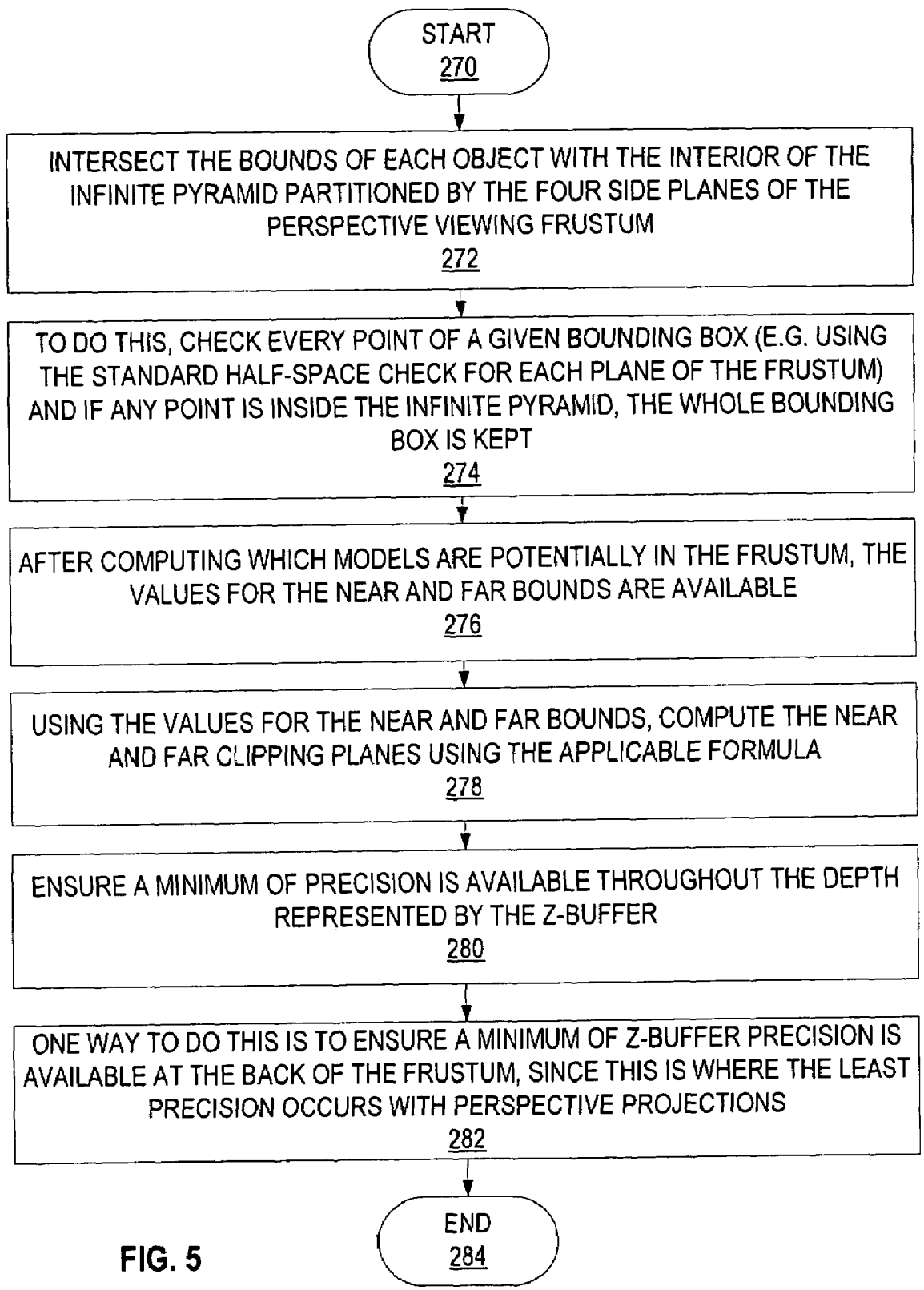
FIG. 5 is a process flow diagram for one implementation of the system of FIG. 1 illustrating the stages involved in automatically generating near and far clipping planes for perspective projections while ensuring a desired minimum Z-buffer precision.

FIG. 5 illustrates the stages involved in automatically generating near and far clipping planes for perspective projections while ensuring a desired minimum Z-buffer precision for one implementation. In one form, the process of FIG. 5 is at least partially implemented in the operating logic of computing device 100. The procedure begins at start point 270 with intersecting the bounds of each object with the interior of the infinite pyramid partitioned by the four side planes of the perspective viewing frustum (stage 272). To do this, every point of a given bounding box is checked, such as using the standard half-space check for each plane of the frustum (stage 274). If any point is inside the infinite pyramid, the whole bounding box is kept (stage 274). After computing which models are potentially in the frustum, the values for the near and far bounds are available (stage 276). The values for the near and far bounds are used to compute the near and far clipping planes using the applicable formula (stage 278).

In one implementation, the near and far clipping planes in the perspective projection case can be calculated using the following formulae:

$$e = \frac{1.5}{2^{24}-1}, \quad n = \frac{S_{near}S_{far}(2*e-1)}{e(S_{near}+S_{far})-S_{far}}, \quad f = \frac{S_{near}S_{far}(2*e-1)}{e(S_{near}+S_{far})-S_{near}}$$

In one implementation, after performing the above calculations, a value is available for the far clipping plane f and the near clipping plane n but nothing has yet been done to control the ratio between f and n, which determines the precision of the Z-buffer.

3D graphics application 200 ensures a desired minimum of precision is available throughout the depth represented by the Z-buffer (stage 280). One way to do this is to ensure a minimum of precision is available at the back of the frustum (see FIG. 6), since this is where the least precision occurs in 3D scenes which have been projected using a perspective projection (stage 282). The process ends at end point 284.

Figure 6:
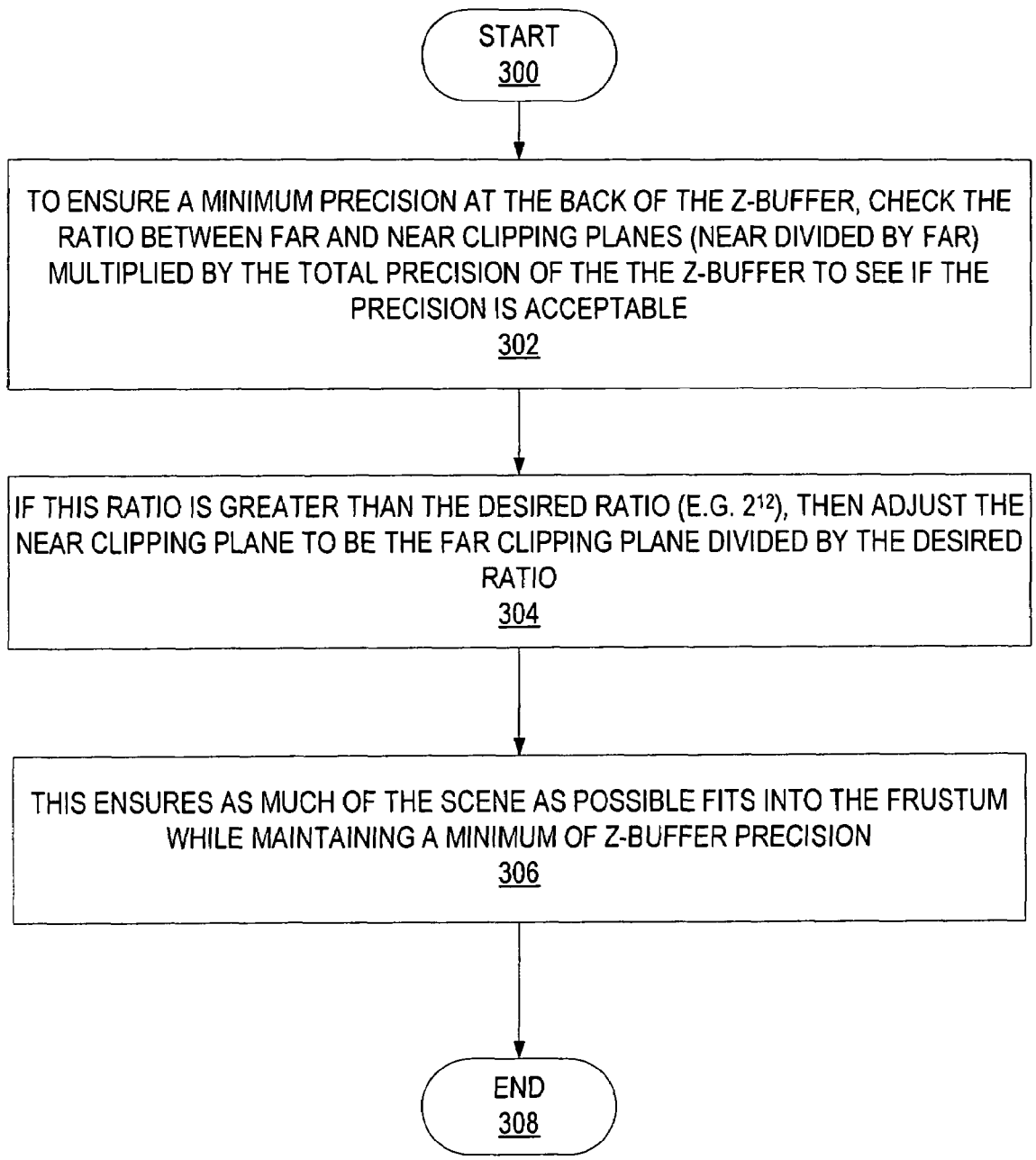
FIG. 6 is a process flow diagram for one implementation of the system of FIG. 1 illustrating the stages involved in ensuring a desired minimum Z-buffer precision at the back of the Z-buffer for a perspective projection.

FIG. 6 illustrates the process for ensuring a desired minimum Z-buffer precision at the back of the Z-buffer for a perspective projection in one implementation in more detail. In one form, the process of FIG. 6 is at least partially implemented in the operating logic of computing device 100. The procedure begins at start point 300 with ensuring a minimum precision at the back of the Z-buffer, by checking the ratio between far and near clipping planes (near divided by far) multiplied by the total precision of the Z-buffer to see if the precision is acceptable (stage 302). If this ratio is greater than the desired ratio (e.g. $2^{12}$), then the near clipping plane is adjusted to be the far clipping plane divided by the desired ratio (stage 304). This ensures as much of the scene as possible fits into the frustum while maintaining a minimum of precision (stage 306).

Let's look at a non-limiting example to see how this works. If you think of the frustum ranging from:

$u = [0 \ldots 1],$ and a ratio $k = \frac{f}{n}$, then the rate of change of Z-buffer values with respect to u is:

$$Z'(u) = \frac{\partial Z}{\partial u} = \frac{k}{(ku-u+1)^2}.$$

This indicates how sampling is scaled from linear, so at the front of the frustum $Z'(0)=k$ and at the back of the frustum:

$$Z'(1) = \frac{1}{k} = \frac{n}{f}.$$

This means the precision at the back of our buffer differs from a linear precision buffer by exactly the ratio between the near and the far plane.

In this non-limiting example, the final step then is to check the ratio of near clipping plane divided by far clipping plane and ensure that when multiplied by the total precision of the Z-buffer, acceptable final precision results (stage 302). If this ratio is greater than the desired ratio value r for the desired precision, then the near clipping plane is adjusted by dividing the far clipping plane by the desired ratio value r (stage 304). This ensures as much of the scene as possible fits into the frustum while maintaining a minimum of precision (stage 306). In one implementation, 3D graphics application 200 ensures that the rear of the buffer has the same precision as a 12 bit linear precision buffer, which means $r=2^{12}$, since the Z buffer has 24 bits in such a scenario. Other values and variations can be used in alternate implementations. The process ends at end point 308.

Figure 7:
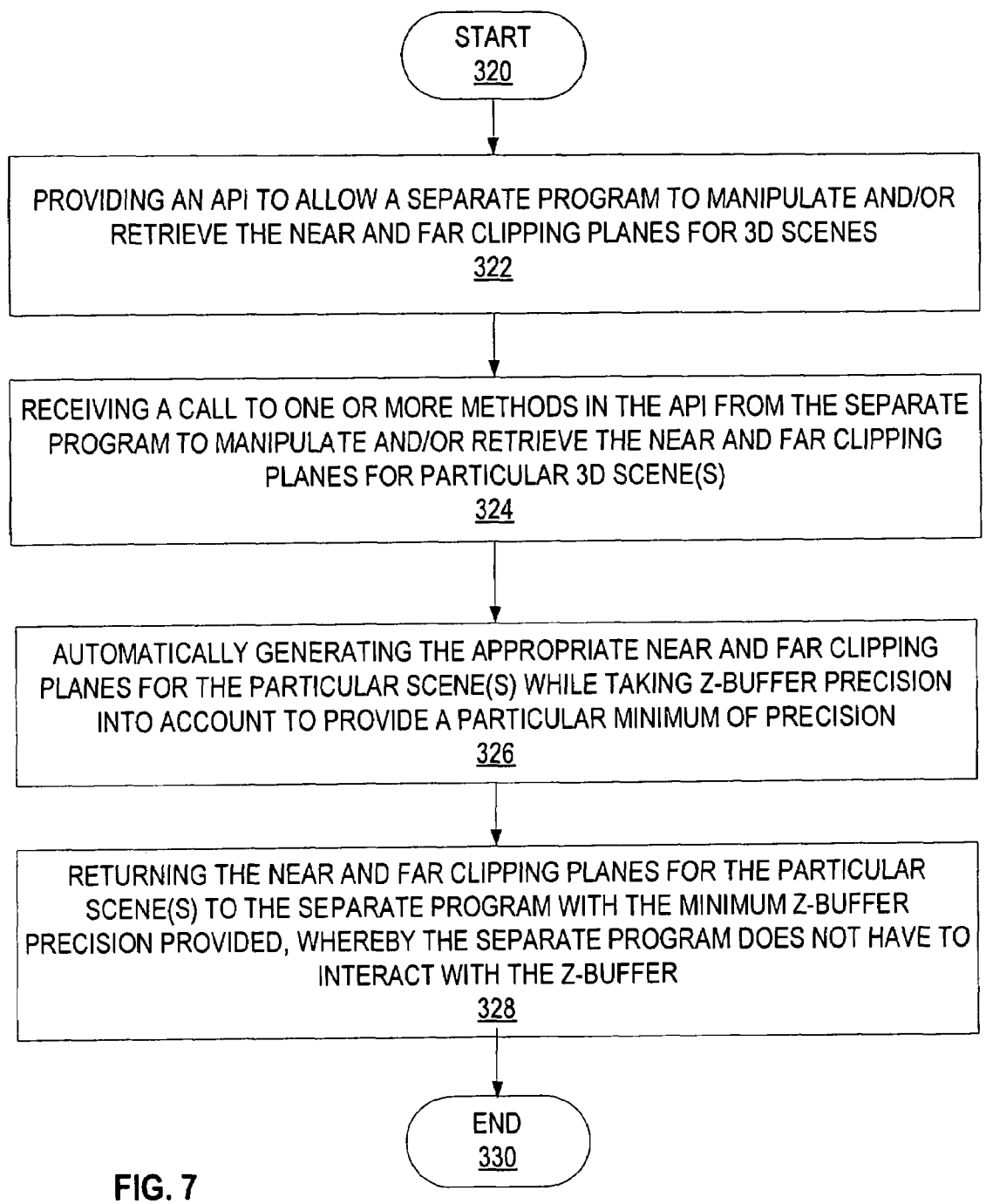
FIG. 7 is a process flow diagram for one implementation of the system of FIG. 1 that illustrates providing an API to allow a separate program to manipulate and/or retrieve the near and far clipping planes for 3D scenes.

FIG. 7 is a flow diagram for one implementation that illustrates providing an API to allow a separate program to manipulate and/or retrieve the near and far clipping planes for 3D scenes. In one form, the process of FIG. 7 is at least partially implemented in the operating logic of computing device 100. FIG. 7 begins at start point 320 with providing an API to allow a separate program to manipulate and/or retrieve the near and far clipping planes for 3D scenes (stage 322). 3D graphics application 200 receives a call to one or more methods in the API from the separate program to manipulate and/or retrieve the near and far clipping planes for particular 3D scene(s) (stage 324). 3D graphics application 200 automatically generates the appropriate near and far clipping planes for the particular scene(s) while taking Z-buffer precision into account to provide a particular minimum desired level of precision (stage 326). 3D graphics application 200 returns the near and far clipping planes for the particular scene(s) to the separate program with the minimum Z-buffer precision provided, so that the separate program does not have to interact with the Z-buffer (stage 328). The process then ends at end point 330.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

What is claimed is:

1. A method for automatically generating near and far clipping planes for 3D scenes comprising the steps of:
   intersecting a plurality of bounding boxes of scene models with a viewing frustum to determine a range of depth that a particular scene occupies in the viewing frustum;
   setting a near clipping plane and a far clipping plane according to a set of scene bounds;
   analyzing a ratio of the near clipping plane to the far clipping plane to determine whether there is a desired level of numerical precision in a Z-buffer; and
   if the precision in the Z-buffer is not at the desired level, then adjusting the near clipping plane and the far clipping plane appropriately to achieve the desired level of numerical precision, wherein the ratio is calculated by first dividing the near clipping plane by the far clipping plane to determine a first result and then multiplying the first result by a value representing the desired level of numerical precision in the Z-buffer, wherein said steps are executed in a computing device.

2. The method of claim 1, further comprising:
   prior to the analyzing step, widening the set of scene bounds a particular amount to account for triangles lying on the bounds.

3. The method of claim 2, wherein the widening step prevents triangles which are parallel to the near clipping plane and the far clipping plane from accidentally being clipped.

4. The method of claim 1, wherein particular scene is based on a perspective projection.

5. The method of claim 1, wherein the adjusting step comprises adjusting the near clipping plane to be the far clipping plane divided by the ratio.

6. The method of claim 1, wherein the particular scene is based on an orthographic projection.

7. The method of claim 1, further comprising:
   returning the near clipping plane and the far clipping plane for the particular scene to a separate application for use in the separate application.

8. A computer-readable medium having computer-executable instructions for causing a computer to perform steps comprising:
   set a near clipping plane and a far clipping plane according to a set of scene bounds;
   move the near clipping plane a particular amount to account for triangles lying on the bounds;
   move the far clipping plane a particular amount to account for triangles lying on the bounds;
   analyze a ratio of the near clipping plane to the far clipping plane to determine whether there is a desired level of numerical precision in a Z-buffer; and
   if the precision in the Z-buffer is not at the desired level, then adjust the near clipping plane and the far clipping plane appropriately to achieve the desired level of numerical precision, wherein the ratio is calculated by first dividing the near clipping plane by the far clipping plane to determine a first result and then multiplying the first result by a value representing the desired level of numerical precision in the Z-buffer.

9. The computer-readable medium of claim 8, further operable to cause a computer to perform steps comprising:
   return the near clipping plane and the far clipping plane for the particular scene to a separate application for use in the separate application.

10. The computer-readable medium of claim 9, wherein the separate application does not have to interact with the Z-buffer.

11. The computer-readable medium of claim 8, wherein the near clipping plane is adjusted to be the result of dividing the far clipping plane by the ratio.

12. The computer-readable medium of claim 8, wherein by widening the set of scene bounds the particular amount, triangles which are parallel to the near clipping plane and the far clipping plane are prevented from accidentally being clipped.

13. A method for automatically generating near and far clipping planes comprising the steps of:
   providing an application program interface to allow a separate program to retrieve a near clipping plane and a far clipping plane for a 3D scene;
   receiving a call to at least one method in the API from the separate program to retrieve the near clipping plane and the far clipping plane for the 3D scene;
   automatically generating the near clipping plane and the far clipping plane for the 3D scene while taking precision into account for a Z-buffer; and
   returning the near clipping plane and the far clipping plane for the 3D scene to the separate program, whereby the separate program does not have to interact with the Z-buffer, wherein the precision is taken into account for the Z-buffer by adjusting the near clipping plane to be the far clipping plane divided by a desired ratio, wherein said steps are executed in a computing device.

14. The method of claim 13, wherein the precision is taken into account at a back of a frustum associated with the near clipping plane and the far clipping plane.

15. A computer-readable medium having computer-executable instructions for causing a computer to perform the steps recited in claim 1.

16. A computer-readable medium having computer-executable instructions for causing a computer to perform the steps recited in claim 13.

* * * * *